(12) United States Patent
Murakami et al.

(10) Patent No.: US 8,422,073 B2
(45) Date of Patent: Apr. 16, 2013

(54) IMAGE FORMING APPARATUS

(75) Inventors: Ayumu Murakami, Abiko (JP); Masaru Usami, Toride (JP); Daisuke Morikawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 718 days.

(21) Appl. No.: 12/638,475

(22) Filed: Dec. 15, 2009

(65) Prior Publication Data

US 2010/0157375 A1  Jun. 24, 2010

(30) Foreign Application Priority Data

Dec. 24, 2008 (JP) ................... 2008-328726

(51) Int. Cl.
*H04N 1/60* (2006.01)
*G03F 3/08* (2006.01)

(52) U.S. Cl.
USPC .......... 358/1.9; 358/1.14; 358/3.26; 358/501; 358/504; 358/519

(58) Field of Classification Search ............... 358/1.9, 358/1.14, 3.26, 518
See application file for complete search history.

(56) References Cited

U.S. PATENT DOCUMENTS

| 5,543,940 | A | * | 8/1996 | Sherman | 358/518 |
| 5,696,889 | A | * | 12/1997 | Morikawa | 358/1.9 |
| 7,463,392 | B2 | | 12/2008 | Yamamoto et al. | 358/496 |
| 7,515,312 | B2 | | 4/2009 | Murakami et al. | 358/461 |
| 2004/0105133 | A1 | | 6/2004 | Murakami | 358/474 |
| 2006/0197997 | A1 | | 9/2006 | Oshida et al. | 358/498 |
| 2008/0180706 | A1 | * | 7/2008 | Yanagi | 358/1.9 |
| 2008/0247006 | A1 | * | 10/2008 | Dokuni | 358/498 |
| 2008/0304117 | A1 | | 12/2008 | Aoyama et al. | 358/498 |
| 2009/0122367 | A1 | | 5/2009 | Murakami et al. | 358/498 |

FOREIGN PATENT DOCUMENTS

| JP | 4-371072 | | 12/1992 |
| JP | 5-83480 | | 4/1993 |
| JP | 5-74072 | | 10/1993 |
| JP | 7-193680 | | 7/1995 |
| JP | 2622039 | | 6/1997 |
| JP | 2928449 | | 8/1999 |
| JP | 2000092324 | A * | 3/2000 |
| JP | 2004357074 | A * | 12/2004 |

* cited by examiner

*Primary Examiner* — Richard Zhu
(74) *Attorney, Agent, or Firm* — Fitzpatrick, Cella, Harper & Scinto (57) ABSTRACT

The image forming apparatus includes first and second reading portions which read images of first and second faces of an original, an image forming portion which forms an image on a sheet based on image data read by the reading portions, a calculation portion which calculates difference between respective image data, a correction portion which calculates correction data to decrease difference of the image data based on the image data difference, and a control portion which controls the image forming portion so that an image for correction to correct the reading accuracy difference is formed on a sheet based on the correction data; and the calculation portion calculates difference between respective image data when the image for correction formed on a sheet is respectively read by the first and second reading portions, and the correction portion recalculates correction data based on the image data difference calculated by the calculation portion.

7 Claims, 8 Drawing Sheets

| | 1 | 2 | 3 | 4 | 5 | |
|---|---|---|---|---|---|---|
| | | | | | | |

OUTPUT SHEET B

| | 1 | 2 | 3 | 4 | 5 |
|---|---|---|---|---|---|
| R FRONT FACE | DARK-NESS, DARK | | | ▶ | DARK-NESS, LIGHT |
| R BACK FACE | DARK-NESS, DARK | | | ▶ | DARK-NESS, LIGHT |
| G FRONT FACE | DARK-NESS, DARK | | | ▶ | DARK-NESS, LIGHT |
| G BACK FACE | DARK-NESS, DARK | | | ▶ | DARK-NESS, LIGHT |
| B FRONT FACE | DARK-NESS, DARK | | | ▶ | DARK-NESS, LIGHT |
| B BACK FACE | DARK-NESS, DARK | | | ▶ | DARK-NESS, LIGHT |
| Bk FRONT FACE | DARK-NESS, DARK | | | ▶ | DARK-NESS, LIGHT |
| Bk BACK FACE | DARK-NESS, DARK | | ▼ | ▶ | DARK-NESS, LIGHT |

Labels: Ba, Bb, Bc, Bd

IMAGE FORMING APPARATUS

BACKGROUND OF THE INVENTION

1. Field of the Invention

The present invention relates to an image forming apparatus such as a copying machine, and in particular, relates to an apparatus capable of reading front and back faces of an original.

2. Description of the Related Art

Figure 7:
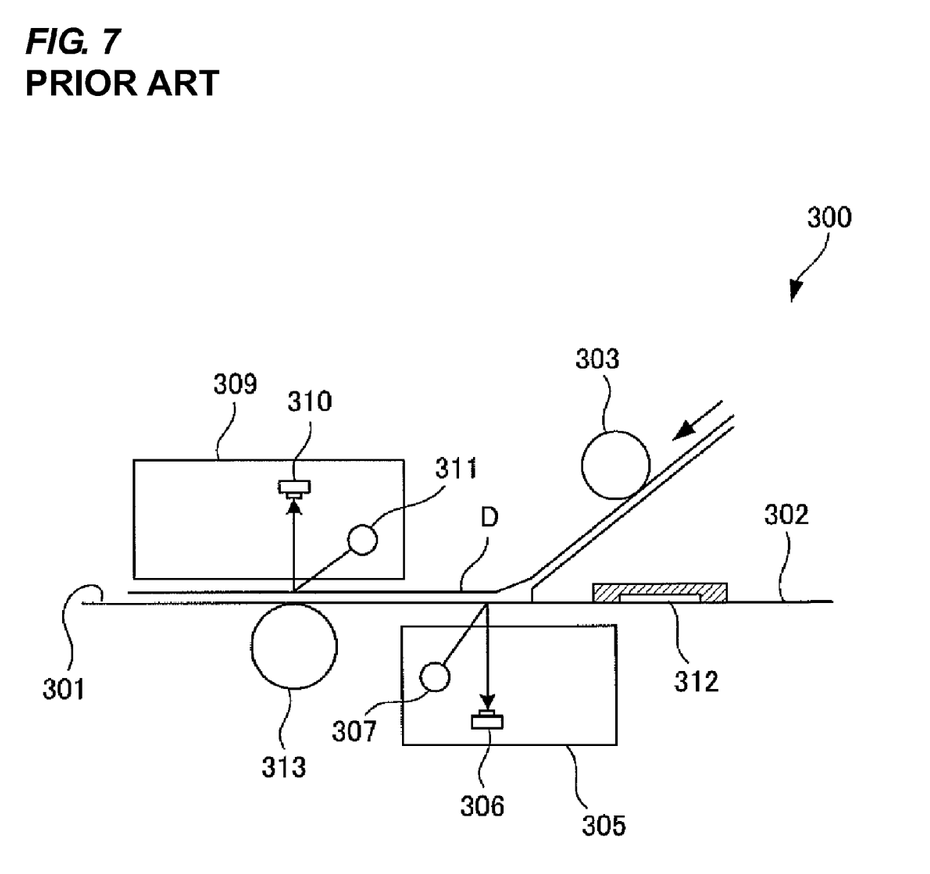
FIG. 7 is an explanatory view which illustrates an example of a reading mechanism portion in an image reading apparatus of the related art.
Figure 8:
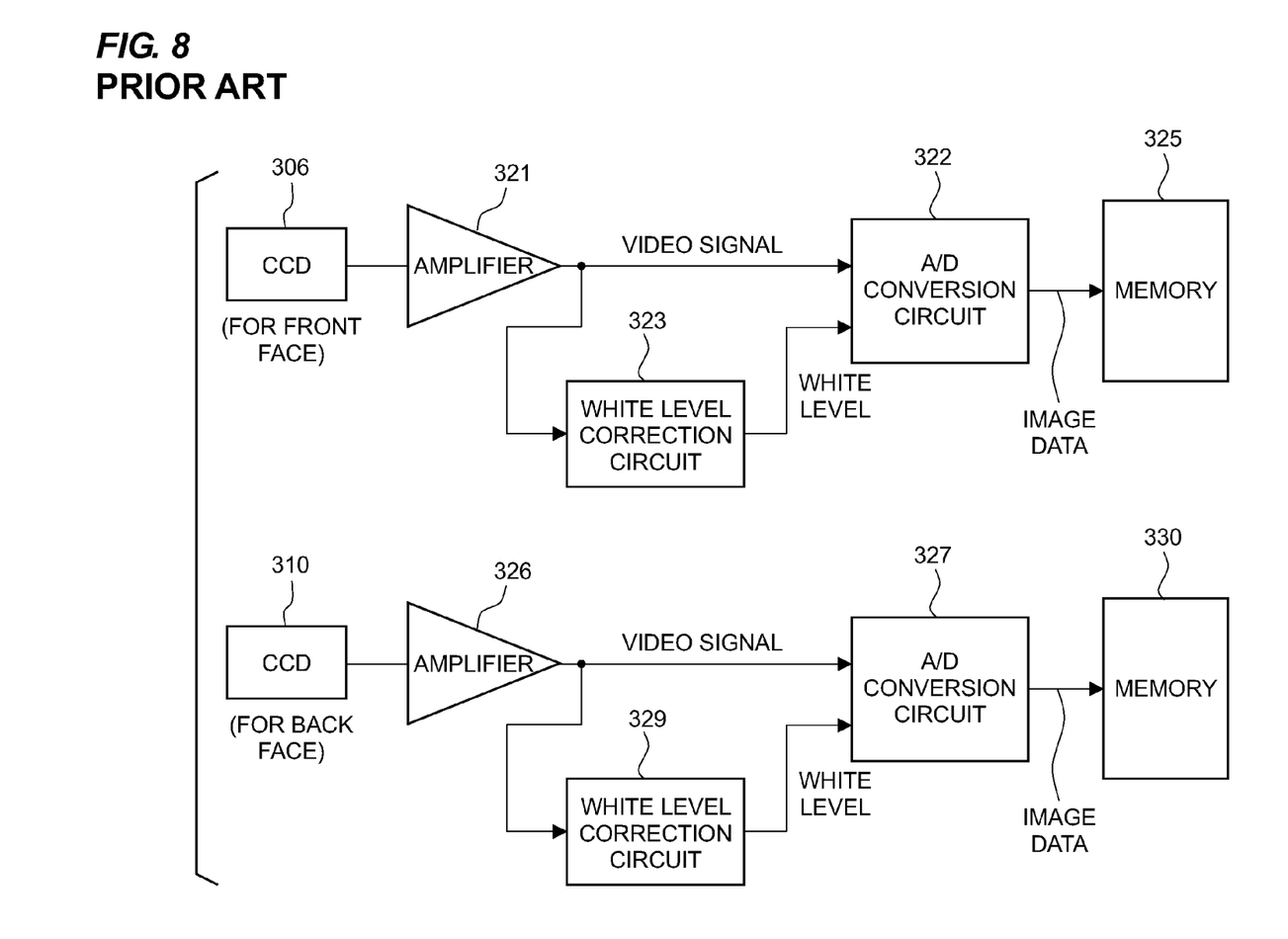
FIG. 8 is an explanatory view which illustrates an image signal processing circuit included in the image reading apparatus of the related art.

A mechanism in an image reading apparatus such as a double-side image scanner of the related art will be described with reference to FIGS. 7 and 8. Here, FIG. 7 is an explanatory view which illustrates an example of a reading mechanism portion 300 in an image reading apparatus of the related art. FIG. 8 is an explanatory view which illustrates an image signal processing circuit included in the image reading apparatus of the related art.

As illustrated in FIG. 7, the reading mechanism portion 300 includes an original base plate 301 to perform reading of originals D and a sheet feeding roller 303 to feed the originals D to the original base plate 301 from an upward angle for continuous reading and double-side reading of the originals D.

An optical reading unit 309 to read a back face of an original is arranged above the original base plate 301. A movable optical reading unit 305 to read a front face of an original is arranged below the original base plate 301. The upper and lower faces of the original D fed from the sheet feeding roller 303 are read by the abovementioned optical reading units 305, 309. In the following, the front face denotes the lower face side of the original D (i.e., the lower side face of the original D in front view of FIG. 7) and the back face denotes the upper face side (i.e., the upper side face of the document D in front view of FIG. 7). Double-side reading is performed on the original D.

A platen 313 doubling as a white reference used as the white reference for the back face of the original D is arranged below the original base plate 301 in front view so as to be opposed to the optical reading unit 309 which is arranged at the upper side. Further, a flat bed portion 302 to be used when fixed-reading is performed on the original D is formed at the original base plate 301. A white reference plate 312 used as the white reference for the front face of the original D is arranged at the flat bed portion 302. Further, the optical reading unit 305 accommodates a lamp 307 and a CCD 306 and the optical reading unit 309 accommodates a lamp 311 and a CCD 310.

When double-side reading of the original D is performed at the abovementioned reading mechanism portion 300, the optical reading unit 305 is stopped at the position as illustrated in FIG. 7 after reading the white reference of the white reference plate 312 which is located at the right side in FIG. 7. Similarly, the optical reading unit 309 is to be on standby after reading the white reference of the platen 313 until the document D is fed.

When the originals D are continuously fed by the sheet feeding roller 303 toward the optical reading units 305, 309, reflecting light of the light irradiated from the lamp 307 is read by the CCD 306 in the optical reading unit 305 as one side. Further, reflecting light of the light irradiated from the lamp 311 is read by the CCD 310 in the optical reading unit 309 as the other side. In this manner, the reading of the upper and lower faces of the originals D is performed.

Next, the image signal processing circuit included in the image reading apparatus of the related art illustrated in FIG. 7 will be described with reference to FIG. 8. In FIG. 8, the image signal processing circuit to read the image of the front face is illustrated at the upper part and the image signal processing circuit to read the image of the back face is illustrated at the lower part. Since the image signal processing circuits for the front face and for the back face respectively have the similar configuration and processing nature, only the processing nature for the front face is described in the following and the description of the processing nature of the image signal processing circuit for the back face is not repeated.

The CCDs 306, 310 indicated in FIG. 7, amplifiers 321, 326, A/D conversion circuits 322, 327, white level correction circuits 323, 329 and memories 325, 330 are illustrated in FIG. 8. Here, for example, white level data for the white reference of the white reference plate 312 which is firstly read by the CCD 306 is stored at the white level correction circuit 323. Then, the outputted video signal after reading the original by the CCD 306 is amplified by the amplifier 321 and inputted to the white level correction circuit 323 and the A/D conversion circuit 322. In the white level correction circuit 323, a ground color level of the inputted video signal is detected, tracking and correcting of the white level are performed by means of the white level data stored at the white level correction circuit 323, and then, the white level is outputted to the A/D conversion circuit 322. The A/D conversion circuit 322, taking the white level received from the white level correction circuit 323 as a saturated value of darkness, converts the video signal of an analog signal received from the CCD 306 via the amplifier 321 into image data of a digital signal of corresponding darkness level. As described above, in the reading mechanism portion 300 in the image reading apparatus of the related art, the front and back faces of originals have been read and stored at the memories 325, 330 while performing the abovementioned conversion process (i.e., the correction process).

Among the apparatuses capable of reading both faces of originals as described above, there has been a configuration having two reading units. A first reading unit is movably mounted on a carrier which runs along an original base plate and a second reference color face for a second reading unit is arranged at the carrier. Then, the positional relation between a fixed first reference color face for the first reading unit and a reading window of the second reading unit is arranged to be symmetric with the positional relation between the second reference color face and a reading window of the first reading unit. Thus, in the double-side reading apparatus having the configuration that two reading units are opposed while sandwiching an original path, it is described that the configuration in which setting of the reference color level for the first and second reading units can be performed with simple operation is provided (see Japanese Utility Model Application Laid-open No. 05-74072).

Further, among the apparatuses capable of reading both faces of originals as described above, there has been a configuration that a white reference sheet is arranged at an original feeding path at a side opposed to a reading position of automatic feed reading of an optical reading unit. In the description of Japanese Patent Application Laid-open No. 05-83480, time required for reading a white reference in the automatic feed reading is shortened by constituting the optical reading unit to read the abovementioned white reference sheet right before an original is fed to the reading position in the automatic feed reading.

Furthermore, among the apparatuses capable of reading both faces of originals as described above, there has been a configuration that a second optical unit to read an original back face with a line image sensor is arranged at a vicinity of a reading position of an optical unit to read an original front face. In this apparatus, a first original base plate unit is constituted with a first white sheet and two clear plates nipping the first white sheet at a part thereof and a second original base plate unit is constituted with a second white sheet and two clear plates nipping the second white sheet at a part thereof. Then, the original base plate unit is to be compact by adopting a configuration that the first white sheet is opposed to the clear part of the second original base plate unit and the second white sheet is opposed to the clear part of the first original base plate unit (see Japanese Patent Application Laid-open No. 07-193680).

As described above, in the image reading apparatuses capable of reading both faces of originals such as the double-side image scanner of the related art, the white level has been generated by the optical reading units for front face reading and back face reading based on each white reference plate such as the white reference sheet and the white sheet.

However, there have been problems (1), (2) with the apparatuses to generate the white level as described above.

(1) In each of the optical reading units respectively for front face reading and back face reading, darkness correction for an intermediate color is not performed even in the case that the white level is appropriately adjusted. Therefore, there has been difference (i.e., deviation) of the reading darkness between the front face and the back face of a double-side original. In particular, for color reading, there is difference of reflecting ratio among color elements (R, G, B) even in the case that the white level is adjusted against the white reference plate.

Accordingly, there has been color difference of the read images. Consequently, there has been required to take costly measures such as performing white level setting based on the reflecting ratio measured for respective color elements (R, G, B) against a white level member of each part.

(2) The tone characteristics of the optical reading units for front face reading and back face reading are respectively varied due to variation (in accordance with durability) of light spectral characteristics of the lamp for mainly illuminating originals. Therefore, deviation of reading darkness between the front face and the back face of a double-side original has been occurred with time even in the case that the tone correction including intermediate colors of the optical reading units for front face reading and back face reading has been performed at factory shipment.

In the related art, there has been proposed a reading tone correction method to perform level-adjustment so that reading values of the front and back faces are matched by preparing a white reference sheet for testing having constant reflecting ratio at the front and back faces and by performing reading of the front and back faces (see Japanese Patent Application Laid-open No. 04-371072). With this proposal, although the problem (1) may be solved, the deviation of reading darkness between the front and back faces occurring as the problem (2) may not be solved. Further, increase in cost and expense in time for managing have been caused in view of preparing a special sheet for adjustment.

SUMMARY OF THE INVENTION

The present invention provides an image forming apparatus which reliably decreases difference of reading accuracy occurring at first and second reading means with a simple configuration by forming an image for correction based on correction data and recalculating the correction data based on the image for correction.

The present invention provides an image forming apparatus, includes: a first reading portion which reads an image of a first face of an original; a second reading portion which reads an image of a second face of an original; an image forming portion which forms an image on a sheet based on image data read by the first and second reading portions; a calculation portion which calculates difference between respective image data when a predetermined image formed on a sheet is respectively read by the first and second reading portions; a correction portion which calculates correction data to decrease difference of the image data caused by reading accuracy difference between the first and second reading portions based on the image data difference calculated by the calculation portion; and a control portion which controls the image forming portion so that an image for correction to correct the reading accuracy difference is formed on a sheet based on the correction data; wherein the calculation portion calculates difference between respective image data when the image for correction formed on the sheet is respectively read by the first and second reading portions; and the correction portion recalculates correction data based on the image data difference calculated by the calculation portion.

With the present invention, the image for correction is formed based on the correction data, and then, the difference of the image data is recalculated based on the image for correction and the correction data is recalculated. Therefore, the difference of the reading accuracy between the first and second reading means can be reliably decreased with a simple configuration.

Further features of the present invention will become apparent from the following description of exemplary embodiments with reference to the attached drawings.

DESCRIPTION OF THE EMBODIMENTS

In the following, exemplary embodiments of the present invention will be described in detail with reference to the drawings.

Figure 1:
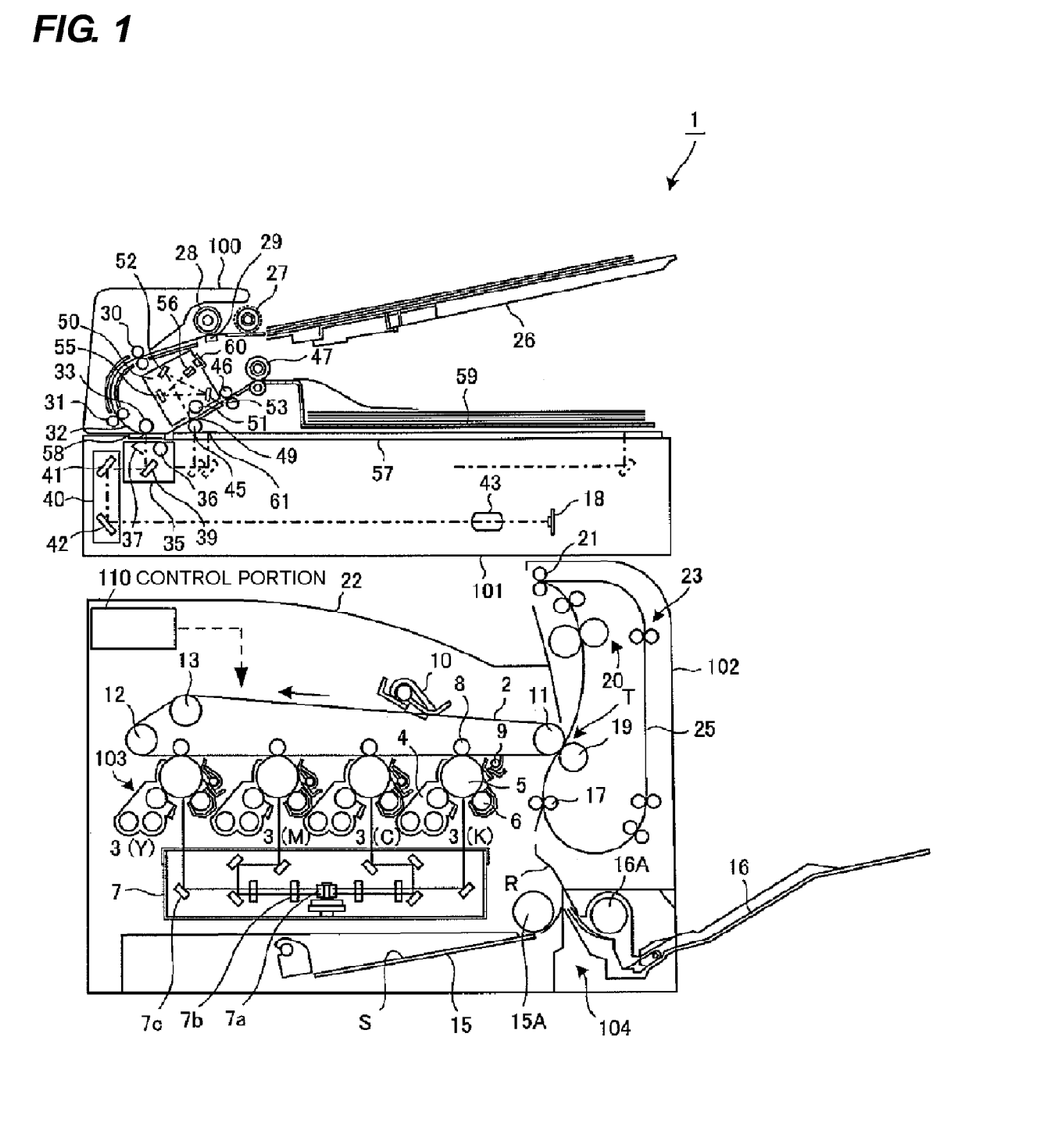
FIG. 1 is a schematic view which illustrates the configuration of a full-color copying machine utilizing an in-line type intermediate transfer member as an example of an image forming apparatus according to an embodiment of the present invention.

FIG. 1 is a schematic view which illustrates the configuration of a full-color copying machine utilizing an in-line type intermediate transfer member as an example of an image forming apparatus according to an embodiment of the present invention. Here, the image forming apparatus of the embodiment may be a monochrome copying machine.

FIG. 1 shows a full-color copying machine (hereinafter, called the copying machine) 1 as an example of the image forming apparatus and a copying machine main body (hereinafter, called the apparatus main body) 102. An image forming portion 103 to form an image on a sheet is arranged at the apparatus main body 102 and an image reader 101 is arranged at the upper face of the apparatus main body 102. Further, a sheet cassette apparatus 104 to feed a sheet to the image forming portion 103 is arranged at the lower part of the apparatus main body 102.

The image forming portion 103 includes four pair of process units 3 (Y, M, C, K) which respectively form toner images of yellow (Y), magenta (M), cyan (C) and black (K) on a transfer belt 2 which is an ITB belt. The process units 3 are arranged serially in the order of Y, M, C and K from the upstream side in the conveying direction of the transfer belt 2. The process units 3 having the similar configuration respectively include a development device 4 accommodating toner of each color and a photoreceptor 5 as an image bearing member.

A roller charging type device 6 to provide even potential to the photoreceptor 5 is arranged at the vicinity of the photoreceptor 5 of the process unit 3 so as to be opposed to the surface of the photoreceptor 5 in the direction perpendicular to the moving direction of the photoreceptor 5.

A laser scanner 7 to perform image exposure to the photoreceptor 5 is arranged below the process units 3. The laser scanner 7 includes a polygon mirror 7a to perform polarization scanning of emitted laser beams and a first image forming lens 7b to form a spot image with the laser beams on a drum. In addition, the laser scanner 7 having a reflection mirror 7c to reflect the laser beams passing through the first image forming lens 7b toward a predetermined direction is configured with an optical case to support and fix each optical element.

Further, a primary transfer roller 8 is arranged at the position opposed to the photoreceptor 5 and nipping the transfer belt 2 therewith. In order to form an image at the image forming portion 103, image exposure of the image data of respective colors of Y, M, C, K is performed on the photoreceptor 5, and then, a toner image is developed on the photoreceptor 5 by the development device 4 by the laser scanner 7. The toner image formed on the photoreceptor 5 is transferred to the transfer belt 2 by applying voltage to the primary transfer roller 8. Here, after the transferring of the toner image, the remaining transfer toner on the photoreceptor 5 is eliminated by a cleaning device 9 to perform recollection with a blade. The photoreceptor 5 is rotated in the clockwise direction in front view of FIG. 1 by being powered by a drive source (not illustrated) or by following to the transfer belt 2.

The transfer belt 2 is extended by a transfer drive roller 11, a tension roller 12 and a driven roller 13. The transfer belt 2 is moved around in the arrow direction (i.e., the counterclockwise direction) by the transfer drive roller 11, and then, the toner images formed on respective photoreceptors 5 are transferred as being sequentially superimposed.

Figure 2:
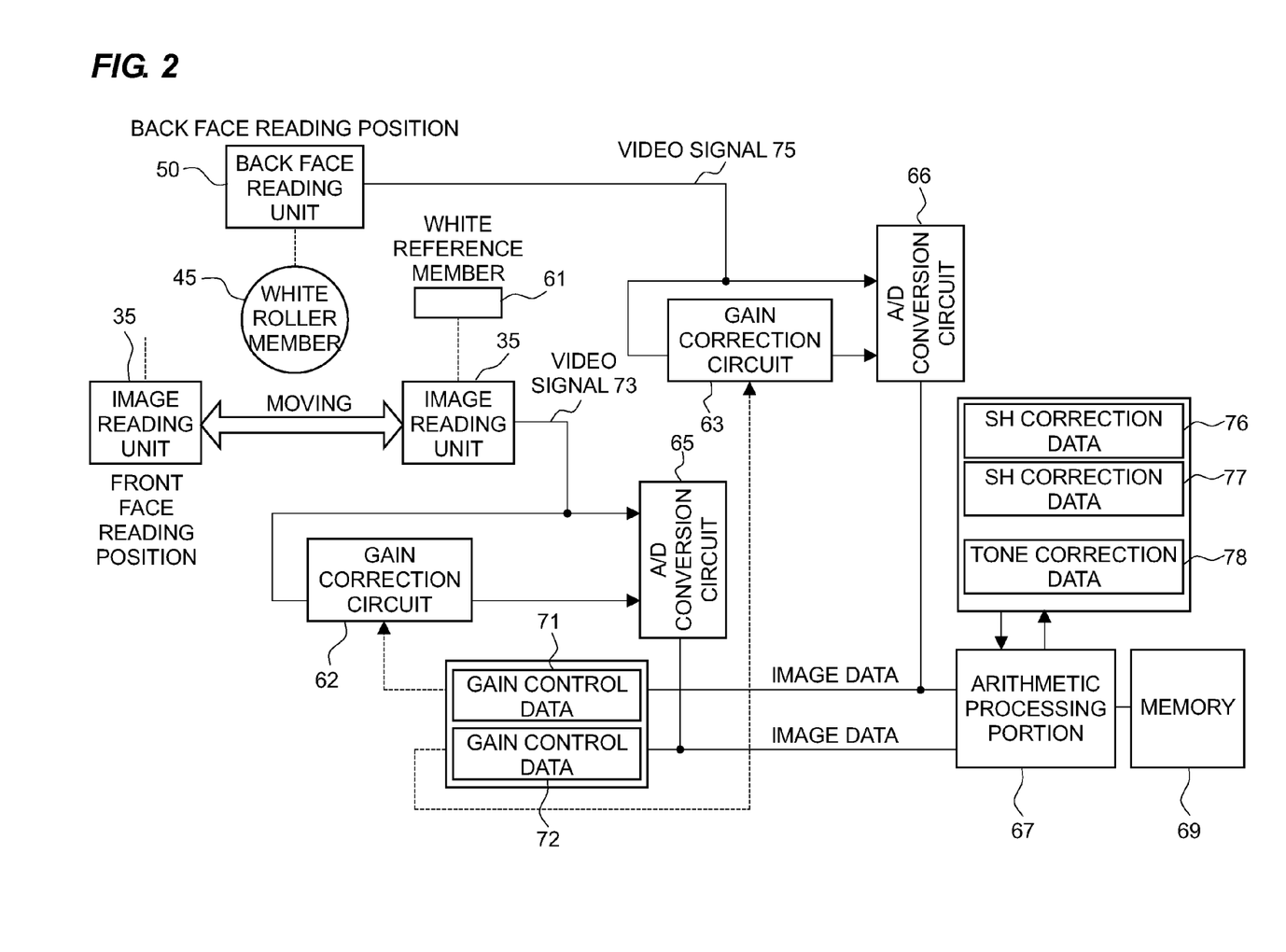
FIG. 2 is a block diagram which illustrates a control system including an image signal processing circuit for reading of the copying machine.

Further, the copying machine 1 has a control portion 110 to perform the whole control thereof as illustrated in FIG. 1. The control portion 110 is formed of a CPU circuit portion including a CPU, a RAM and a ROM (not illustrated). The CPU performs basic control of the whole copying machine 1. The ROM stores a control program to generally control the copying machine 1 such as a control program to control the image reader 101 and a control program to control the image forming portion 103, for example. The RAM temporally stores control data or is utilized as a work area of an arithmetic process accompanied by the control. In the present embodiment, the control portion 110 is mainly for the image forming portion 103 of image forming and a control system of reading as illustrated in FIG. 2, as described later.

Meanwhile, the sheet cassette apparatus 104 has a sheet cassette 15 and conveys the sheets S held at the sheet cassette 15 one by one with a conveying roller 15A to a conveying path R. Further, the sheets S held at a multi sheet tray 16 are conveyed one by one to the conveying path R by a conveying roller 16A. The sheet S conveyed from the sheet cassette apparatus 104 or the multi sheet tray 16 is temporally stopped at a registration roller 17 arranged at the downstream side in the conveying direction of the conveying path R. After the sheet S is temporally stopped, the registration roller 17 starts to rotate in accordance with timing of action of the color image formed on the transfer belt 2. Accordingly, the sheet S arrives at a secondary transfer portion T and the color image is secondarily transferred with transfer bias of positive polarity applied to a secondary transfer roller 19.

After the color image is secondarily transferred, the sheet S is conveyed to a fixing device 20 from the secondary transfer portion T. The fixing device 20 fixes the color image by applying heat and pressure. Here, in the case that the image forming operation for the secondary transferring is set to single-side printing, the sheet S is discharged to a discharge tray 22 by a discharge roller 21 after fixing is performed at the fixing device 20. Meanwhile, in the case that the image forming operation for the secondary transferring is set to duplex printing, the sheet S is conveyed to a reversing portion 23 by the discharge roller 21 after the color image is fixed on one face thereof at the fixing device 20. The sheet S conveyed to the reversing portion 23 is reversed in front-back direction by a duplex path 25, and then, a color image is transferred on the other face anew by the secondary transfer roller 19. Subsequently, after the color image transferred on the other face is fixed at the fixing device 20, the sheet S is discharged to the discharge tray 22 by the discharge roller 21. Here, the remaining transfer toner on the transfer belt 2 after secondary transferring to the sheet S is eliminated by a cleaning device 10.

The image reader 101 is provided with an automatic original conveying apparatus 100 (hereinafter called ADF 100) in a state capable of rotating to open and close in the vertical direction. The ADF 100 has a sheet tray 26 at the upper side thereof as an original placing plate. A sheet feeding roller 27, a separation conveying roller 28 and a separation pad 29 are sequentially arranged in the vicinity of the sheet tray 26. Further, a pair of conveying rollers 30 and a pair of upstream leading rollers 31 are arranged in the order thereof on the conveying path for conveying a placed original from the sheet tray 26. In addition, a front face reading portion 32 (hereinafter also called the platen 32) having a platen glass 58 is arranged at the downstream side in the conveying direction.

A front face reading roller 33 formed of a white roller is arranged at the upper side in front view of the platen 32 and an image reading unit (i.e., the first reading portion) 35 is arranged at the lower side thereof. The image reading unit 35 includes a lamp 36 to irradiate light to the front face of an original, a reflector 37, and a mirror 39. Here, the reflecting light from the original is guided to a lens unit 43 via the mirror 39 and mirrors 41, 42 included in a mirror unit 40. Then, the original image is read by being photoelectrically converted with image formation at a light receiving portion of a CCD 18 by the lens unit 43.

A back face reading roller 45 formed of a white roller, a pair of downstream leading rollers 46 and a pair of discharge rollers 47 are sequentially arranged at the downstream side in the conveying direction of the platen 32 at the conveying path from the sheet tray 26. In addition, a back face reading unit (i.e., the second reading portion) 50 having a reading portion 49 to be the reading position of a back face of an original is arranged between the back face reading roller 45 and the pair of downstream leading rollers 46.

The back face reading unit 50 includes a lamp 51 to irradiate light to the back face of an original, mirrors 52, 53, 54, a lens unit 56, and a CCD 60. Here, the reflecting light from the original is guided to the lens unit 56 via the mirrors 52, 53, 54. Then, the original image is read by being photoelectrically converted with image formation at a light receiving portion of the CCD 60 by the lens unit 56.

The abovementioned ADF 100 has the first reading mode (i.e., the fixed-reading mode) to read the original which is placed on an original base plate glass 57 (hereinafter also called the platen glass 57) of the apparatus main body 102 by a user while moving the image reading unit 35. Further, the ADF 100 has the second reading mode (i.e., the flow-reading mode) to read the original while conveying the original set at the sheet tray 26 to feed toward the platen 32 of the apparatus main body 102 in the state that the image reading unit 35 is stopped at a predetermined position (i.e., in the state of FIG. 1).

In the flow-reading mode, the ADF 100 conveys the originals piled on the sheet tray 26 toward the platen 32 and the reading portion 49. At that time, the originals on the sheet tray 26 are fed sequentially from the sheet at the top side by the sheet feeding roller 27 and conveyed after being separated one by one by the separation conveying roller 28 and the separation pad 29. The separated and conveyed original is conveyed to the platen 32 being the reading position of the front face by the pair of conveying rollers 30 and the pair of upstream leading rollers 31.

The top end of the original to be conveyed to the platen 32 strikes a nip portion of the pair of upstream leading rollers 31 to form a loop so that skew feeding is eliminated and top end is registered. Subsequently, the original is conveyed to the reading portion 49 being the reading position of the back face. Then, the original is discharged onto a discharge tray 59 by the pair of downstream leading rollers 46 and the pair of discharging rollers 47.

Meanwhile, in the case of the first reading mode to read image of the original which is placed on the platen glass 57, reading originals is performed while moving the image reading unit 35 in a sub-scanning direction from an original setting reference (not illustrated). Then, a white reference member 61 to be the white reference for the original reading at the image reader 101 is arranged on the platen glass 57 at a striking part of the original in the case that the reading is performed in the first reading mode.

Next, a reading control system of the copying machine 1 of the present embodiment will be described with reference to FIG. 2. FIG. 2 is a block diagram which illustrates the control system including an image signal processing circuit of the reading of the copying machine 1.

In FIG. 2, relativity is respectively indicated by dashed lines so that the image reading unit 35 is coupled with the white reference member 61 being the white reference thereof and the back face reading unit 50 is coupled with the white roller member 45 being the white reference thereof. Further, a moving state of the position of the image reading unit 35 in the fixed-reading mode is indicated by the wide arrow in FIG. 2.

Gain correction circuits 62, 63 and A/D conversion circuits 65, 66 are illustrated in FIG. 2. Roughly describing, the lower side including the image reading unit 35 in FIG. 2 is the signal route for the front face reading and the upper side including the back face reading unit 50 is the signal route for the back face reading. Further, an arithmetic processing portion 67 (i.e., a calculation portion and a correction portion) included in the control portion 110 and a memory 69 such as a RAM (not illustrated) are illustrated in FIG. 2.

A read video signal (i.e., an input video signal 73) of the white reference member 61 acquired by the image reading unit 35 is converted into a digital signal by the A/D conversion circuit 65 without being routed through the gain correction circuit 62. Further, a read video signal (i.e., an input video signal 75) of the white roller member 45 acquired by the back face reading unit 50 is converted into a digital signal by the A/D converter circuit 66 without being routed through the gain correction circuit 63.

The arithmetic processing portion 67 determines gain control data 71, 72 in accordance with respective signal values of the abovementioned digital signals. The gain correction circuits 62, 63 perform gain correction (i.e., signal amplification) of the input video signals 73, 75 which are read by the image reading unit 35 and the back face reading unit 50 by utilizing the gain control data 71, 72.

After the gain control data 71 is determined, the read video signal (i.e., the input video signal 73) of the white reference member 61 acquired by the image reading unit 35 is converted into a digital signal by the A/D conversion circuit 65 once again after being signal-amplified by the gain correction circuit 62. Similarly, the read video signal (i.e., the input video signal 75) of the white roller member 45 acquired by the back face reading unit 50 is converted into a digital signal by the A/D conversion circuit 66 after being signal-amplified by the gain correction circuit 63. Then, SH correction data 76, 77 (i.e., data for a front face 76 and data for a back face 77) for performing shading correction (hereinafter abbreviated as the SH correction) at the arithmetic processing portion 67 are determined based on the values of the converted digital signals.

In this manner, the gain control data 71 and the SH correction data 76 are determined in accordance with the read video signal (i.e., the input video signal 73) of the white reference member 61 acquired by the image reading unit 35, so that the image reading unit 35 is to be capable of reading originals. Further, the gain control data 72 and the SH correction data 77 are determined in accordance with the read video signal (i.e., the input video signal 75) of the white roller member 45 acquired by the back face reading unit 50, so that the back face reading unit 50 is to be capable of reading originals.

The input video signals 73, 75 of the original which is read by the image reading unit 35 and the back face reading unit 50 are converted into digital signals by the A/D conversion circuits 65, 66 after being signal-amplified by the gain correction circuits 62, 63. The SH correction is performed on the converted digital signals by the arithmetic processing portion 67 by utilizing the SH correction data 76, 77. Further, only the image data of the back face read by the back face reading unit 50 is stored at the memory 69 after tone correction is performed based on tone correction data (i.e., the correction data) 78 which is calculated by the arithmetic processing portion 67.

Figure 3:
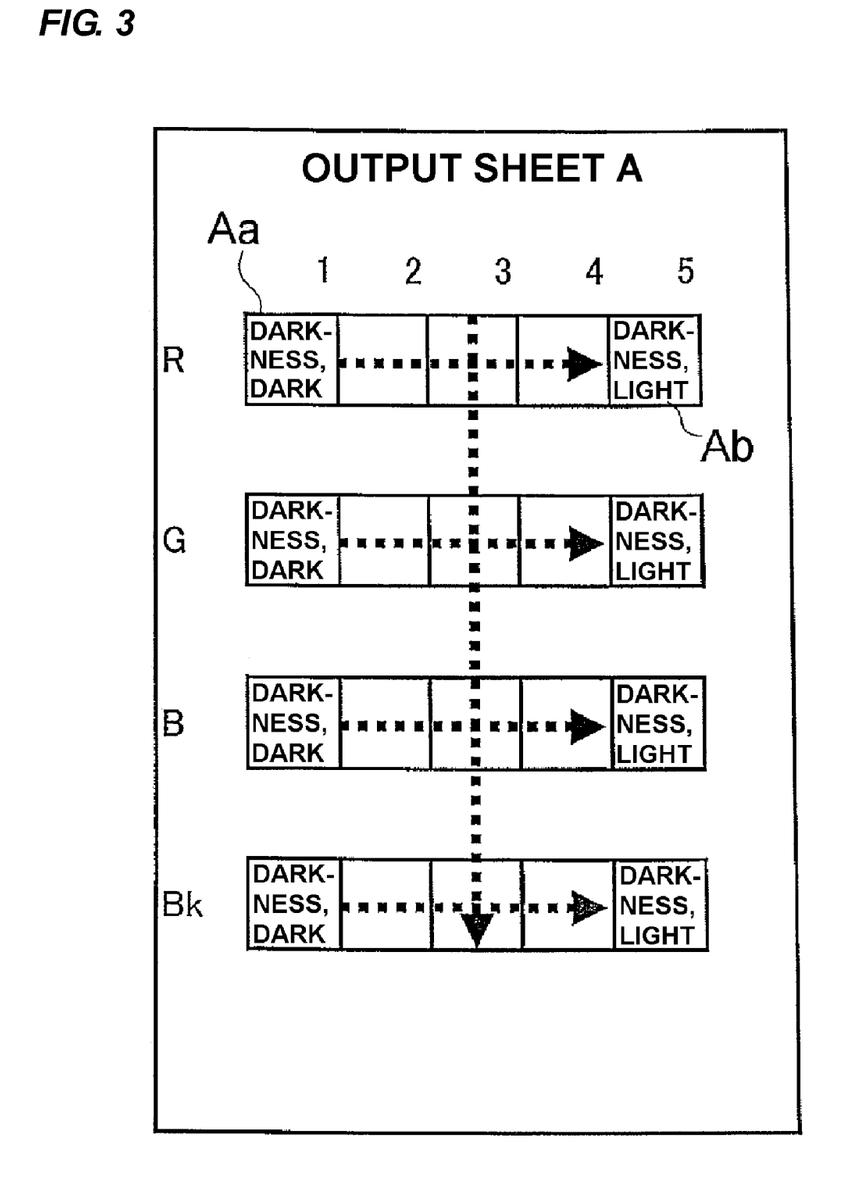
FIG. 3 is a format diagram of a predetermined output sheet to be read when tone correction data is calculated.
Figure 4:
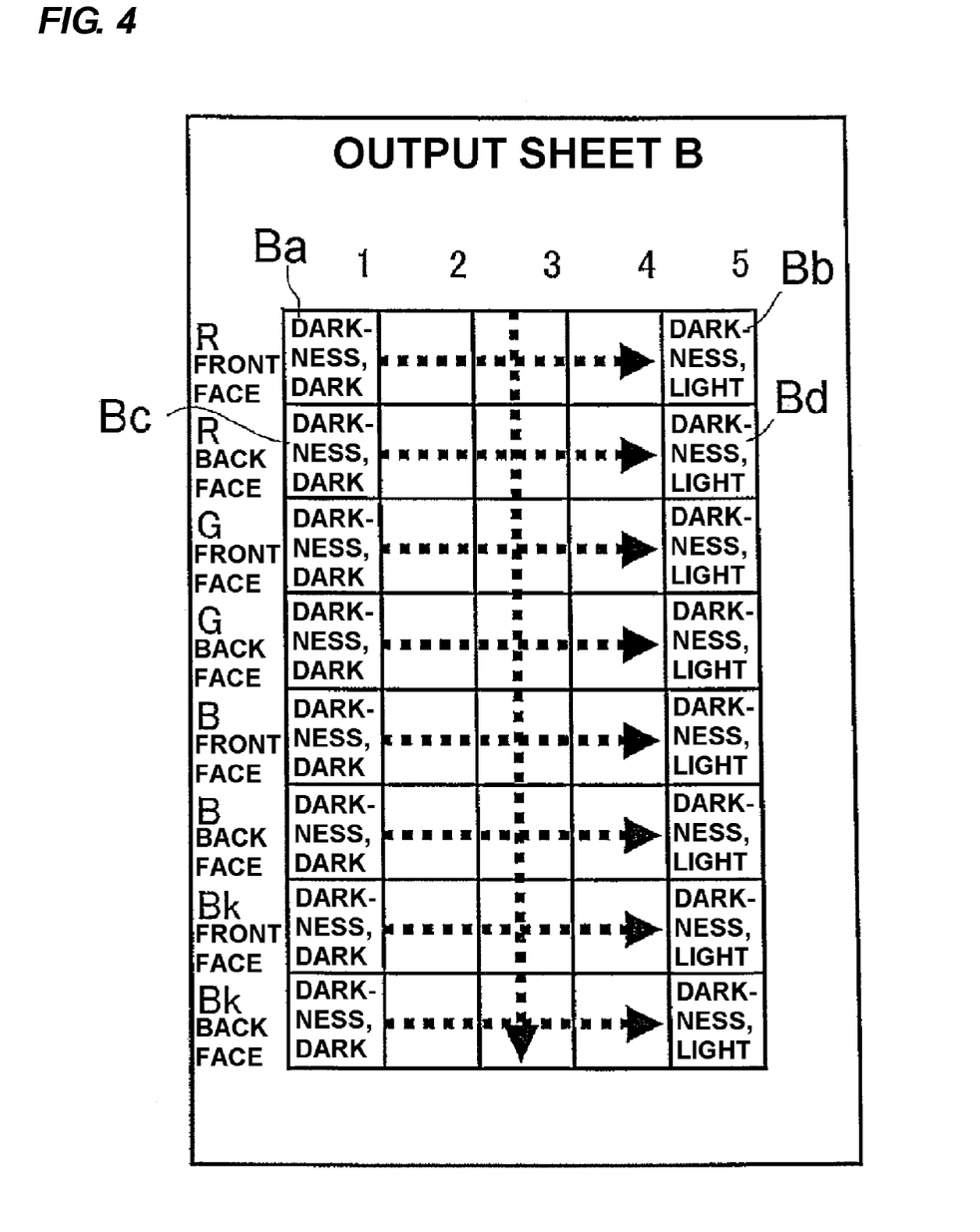
FIG. 4 is a format diagram of an output sheet to be read in a process of recalculating the tone correction data.

As described above, the tone correction (i.e., the darkness correction) is performed on the image data read by the back face reading unit 50 by utilizing the tone correction data 78. Process flow for calculating the tone correction data 78 will be described with reference to FIGS. 3 to 6. Here, FIG. 3 is a format diagram of a predetermined output sheet A to be read when the tone correction data 78 is calculated. FIG. 4 is a format diagram of an output sheet B to be read in a process of recalculating the tone correction data 78. Further, FIG. 5 is a flowchart of a calculating process of the tone correction data 78 and FIG. 6 is a flowchart of the calculating process of the tone correction data subsequent to FIG. 5.

Figure 5:
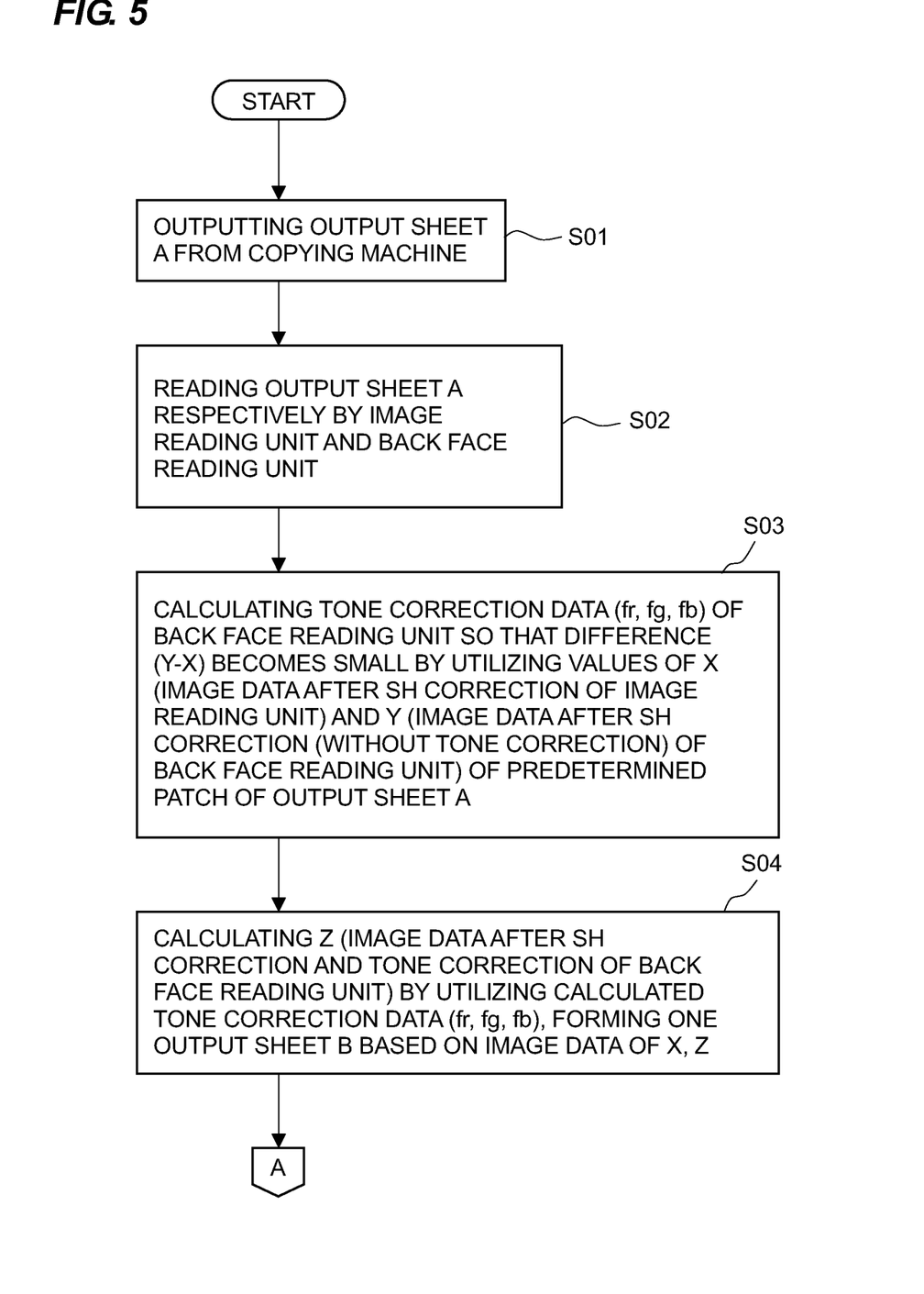
FIG. 5 is a flowchart of a calculating process of the tone correction data.
Figure 6:
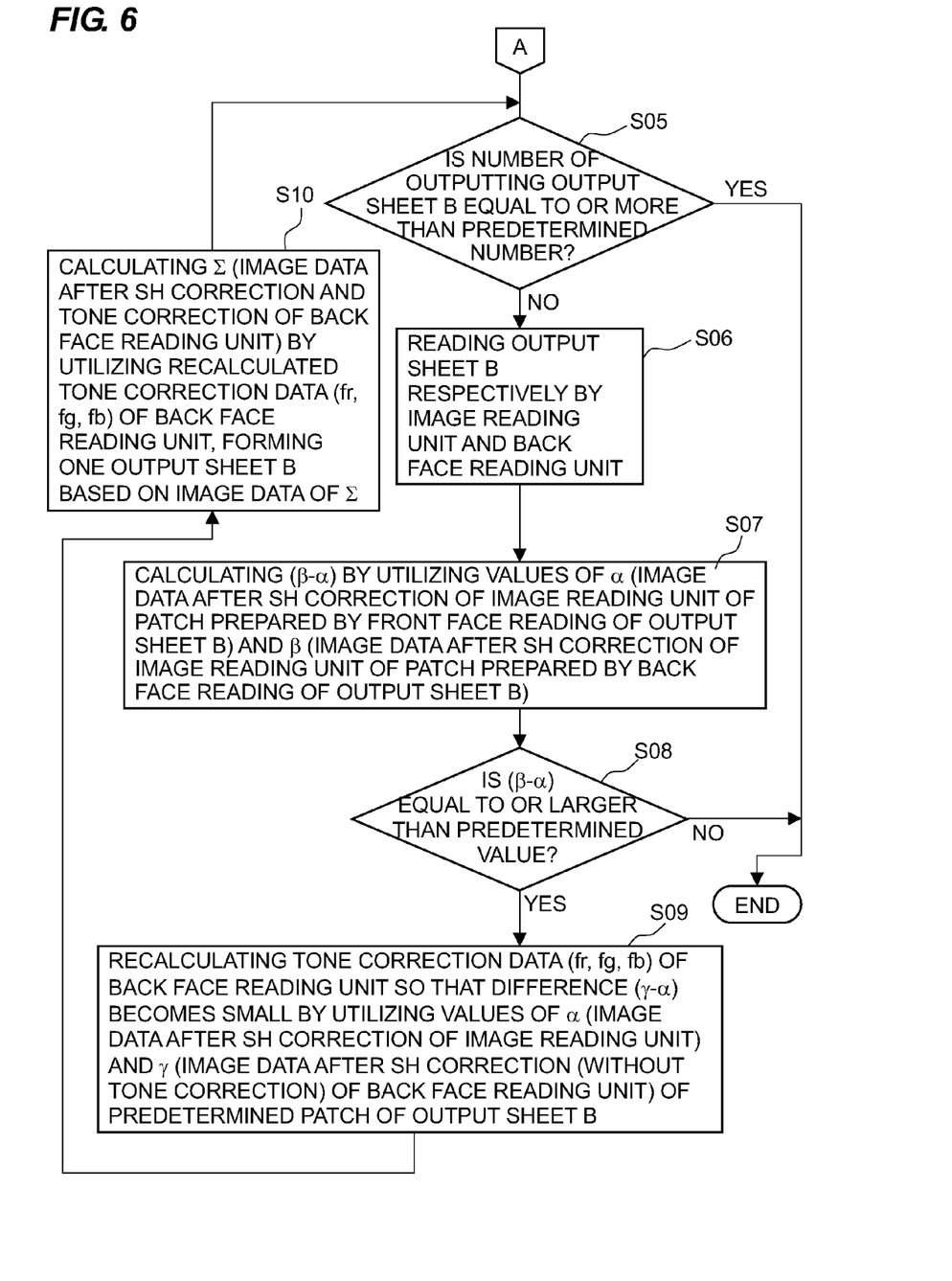
FIG. 6 is a flowchart of the calculating process of the tone correction data subsequent to FIG. 5.

As described in FIG. 5, when a print command is received from an operation portion (not illustrated) from a user, for example, the copying machine 1 outputs an output sheet A by an image forming portion 103 (step S01). The output sheet A is formed as a predetermined image for correction by the image forming portion 103 being controlled by the control portion 110 in the case that the abovementioned print command is received and the tone correction data 78 has not been calculated by the arithmetic processing portion 67. The image data for forming the output sheet A is previously stored at the ROM (not illustrated). Here, in the above description, the output sheet A is formed in the case that the tone correction data 78 has not been calculated by the arithmetic processing potion 67. However, it is natural that the output sheet A may be reformed for newly recalculating the tone correction data 78 even in the case that the tone correction data 78 has been already calculated.

As illustrated in FIG. 3, images of horizontally-oriented rectangle color patterns of read (R), green (G), blue (B) and black (Bk) are sequentially formed on the output sheet A from the upper part. Five approximately square single color patches having the same color but different darkness are arranged horizontally aligned for each color pattern so that the darkness becomes light (from darkness values 1 to 5) from the left toward the right (see the horizontal arrows in FIG. 3). For example, a patch Aa in FIG. 3 is the darkest single color patch in red (a plurality of single color patches having different darkness) and a patch Ab in FIG. 3 is the lightest color patch in red (a plurality of single color patches having different darkness).

Next, when the output sheet A outputted in step S01 is set on the sheet tray 26 and fed in a state that the face with the predetermined image for correction faces up, the color patterns on the output sheet A are read by the image reading unit 35. Subsequently, when the output sheet A is set and fed in a state that the face with the predetermined image for correction faces down, the color patterns on the output sheet A are read by the back face reading unit 50. Namely, the front face to be the first face of the fed output sheet A is read by the image reading unit 35 and the back face to be the second face of the fed output sheet A is read by the back face reading unit 50. Such two reading processes are performed in step S02.

Subsequently, the Bk patches of five tones read by the image reading unit 35 in step S02 are resolved into image data formed of respective elements of R, G, B. For example, the Bk1 patch of darkness value 1 (i.e., the darkest) among the Bk patches read by the image reading unit 35 is resolved into "front_Bk1_R" of R image data, "front_Bk1_G" of G image data and "front_Bk1_B" of B image data. Similar to the above, Bk patches of other darkness values 2 to 5 are respectively resolved into the elements of R, G, B. Thus, the following matrix data (i.e., one image data) X is defined.

$$(X) = \begin{pmatrix} \text{front\_Bk1\_R} & \text{front\_Bk1\_G} & \text{front\_Bk1\_B} \\ \text{front\_Bk2\_R} & \text{front\_Bk2\_G} & \text{front\_Bk2\_B} \\ \text{front\_Bk3\_R} & \text{front\_Bk3\_G} & \text{front\_Bk3\_B} \\ \text{front\_Bk4\_R} & \text{front\_Bk4\_G} & \text{front\_Bk4\_B} \\ \text{front\_Bk5\_R} & \text{front\_Bk5\_G} & \text{front\_Bk5\_B} \end{pmatrix} \quad \text{[Equation 1]}$$

Similarly, the Bk patch of five tones read by the back face reading unit 50 in step S02 are resolved into image data formed of respective elements of R, G, B. For example, the Bk1 patch of darkness value 1 (i.e., the darkest) among the Bk patches read by the back face reading unit 50 is resolved into "back_Bk1_R" of R image data, "back_Bk1_G" of G image data and "back_Bk1_B" of B image data. Similar to the above, Bk patches of other darkness values 2 to 5 are respectively resolved into the elements of R, G, B. Thus, the following matrix data (i.e., the other image data) Y is defined.

$$(Y) = \begin{pmatrix} \text{back\_Bk1\_R} & \text{back\_Bk1\_G} & \text{back\_Bk1\_B} \\ \text{back\_Bk2\_R} & \text{back\_Bk2\_G} & \text{back\_Bk2\_B} \\ \text{back\_Bk3\_R} & \text{back\_Bk3\_G} & \text{back\_Bk3\_B} \\ \text{back\_Bk4\_R} & \text{back\_Bk4\_G} & \text{back\_Bk4\_B} \\ \text{back\_Bk5\_R} & \text{back\_Bk5\_G} & \text{back\_Bk5\_B} \end{pmatrix} \quad \text{[Equation 2]}$$

Then, the tone correction data 78 of the image data read by the back face reading unit 50 (i.e., the back face image data) is calculated so as to be capable of defining functions fr, fg, fb as described below.

R signal value after tone correction of the back face image data=fr (R signal value before tone correction of the back face image data)

G signal value after tone correction of the back face image data=fg (G signal value before tone correction of the back face image data)

B signal value after tone correction of the back face image data=fb (B signal value before tone correction of the back face image data)

Specifically, the difference of the image data as subtracting the matrix data X from the matrix data Y is calculated by the arithmetic processing portion 67. Then, based on the above, the tone correction data 78 (fr, fg, fb) are calculated so as to decrease the image data difference. In other words, the tone correction data 78 is calculated, having one image data read by the image reading unit 35 to be a reference, as the correction data so that the other image data read by the back face reading unit 50 is matched thereto. The operation process to acquire the matrix data X, Y and the tone correction data 78 as described above is performed in step S03.

Next, the SH correction and the tone correction are performed on the image data of the output sheet A read by the back face reading unit 50 based on the tone correction data 78 (fr, fg, fb) which is calculated in step S03. Thus, the following matrix data Z is defined.

$$(Z) = \begin{pmatrix} fr(\text{back\_Bk1\_R}) & fg(\text{back\_Bk1\_G}) & fb(\text{back\_Bk1\_B}) \\ fr(\text{back\_Bk2\_R}) & fg(\text{back\_Bk2\_G}) & fb(\text{back\_Bk2\_B}) \\ fr(\text{back\_Bk3\_R}) & fg(\text{back\_Bk3\_G}) & fb(\text{back\_Bk3\_B}) \\ fr(\text{back\_Bk4\_R}) & fg(\text{back\_Bk4\_G}) & fb(\text{back\_Bk4\_B}) \\ fr(\text{back\_Bk5\_R}) & fg(\text{back\_Bk5\_G}) & fb(\text{back\_Bk5\_B}) \end{pmatrix} \quad \text{[Equation 3]}$$

Then, the control portion 110 forms an image for correction on one face of one sheet (i.e., the output sheet B) with the image data formed of the matrix data X and the matrix data Z acquired as described above by controlling the image forming portion 103 (step S04). Specifically, the matrix data X is the image data after SH correction of the image reading unit 35 and the matrix data Z is the image data after the SH correction and the tone correction of the back face reading unit 50. Accordingly, a predetermined image for correction read by the image reading unit 35 and the tone-corrected image of a predetermined image for correction read by the back face reading unit 50 are formed on the output sheet B. The image of the output sheet B formed as described above is utilized for the image for correction to correct the difference of the reading accuracy thereafter. Accordingly, the difference of the reading accuracy between the image reading unit 35 and the back face reading unit 50 can be further decreased.

More specifically, as illustrated in FIG. 4, the image for correction of the output sheet B is formed as horizontally-oriented rectangle color patterns of read (R), green (G), blue (B) and black (Bk) which are sequentially formed from the upper part. Five square-shaped single color patches having the same color but different darkness are arranged horizontally aligned for each color pattern so that the darkness becomes light from the left toward the right (see the horizontal arrows in FIG. 4). Further, each color pattern is formed by coupling two rows of an upper row and a lower row. The upper row is formed from the front face image data read by the image reading unit 35 and the lower row is formed from the back face image data read by the back face reading unit 50. In each color pattern coupling two rows of the upper row and the lower row, patches of the same color and the same darkness are arranged adjacent to each other. For example, in FIG. 4, regarding the patch Ba and the patch Bc which are arranged vertically adjacent to each other, the patch Ba is the darkest single color patch among the front face color patterns in red and the patch Bc is the darkest single color patch among back face color patterns in red. Further, for example, regarding the patch Bb and the patch Bd, the patch Bb is the lightest single color patch among the front face color patterns in red and the patch Bd is the lightest single color patch among the back face color patterns in red.

Subsequently, after the output sheet B is formed in step S04, it is determined whether or not the output number of the output sheet B is equal to or more than a predetermined number (step S05 in FIG. 6). When the number is equal to or more than the predetermined number (Yes, in step S05), the tone correction data 78 is determined and the arithmetic process ends.

Meanwhile, when the output number of the output sheet B is less than the predetermined number in step S05 (No, in step S05), following processes of sheet feeding and reading are sequentially performed. That is, when the output sheet B is set on the sheet tray 26 and fed in a state that the formed image for correction faces up, the color patterns on the output sheet B are read by the image reading unit 35. Subsequently, when the output sheet B is set and fed in a state that the formed image for correction faces down, the color patterns on the output sheet B are read by the back face reading unit 50. Namely, the patch image formed on the fed output sheet B is read by the image reading unit 35 and the back face reading unit 50. Such two reading processes are performed in step S06.

Subsequently, the front face image data read by the image reading unit 35 in step S06 (i.e., the Bk patches of five tones at the upper row on the output sheet B) are resolved into image data formed of respective elements of R, G, B after the SH correction. For example, the Bk1 patch of darkness value 1 (i.e., the darkest) among the Bk patches of the upper row read by the image reading unit 35 is resolved into "front-up_Bk1_R" of R image data, "front-up_Bk1_G" of G image data and "front-up_Bk1_B" of B image data. Similar to the above, Bk patches of other darkness values 2 to 5 are respectively resolved into the elements of R, G, B. Thus, the following matrix data (i.e., one image data) α is defined.

$$(\alpha) = \begin{pmatrix} \text{front-up\_Bk1\_R} & \text{front-up\_Bk1\_G} & \text{front-up\_Bk1\_B} \\ \text{front-up\_Bk2\_R} & \text{front-up\_Bk2\_G} & \text{front-up\_Bk2\_B} \\ \text{front-up\_Bk3\_R} & \text{front-up\_Bk3\_G} & \text{front-up\_Bk3\_B} \\ \text{front-up\_Bk4\_R} & \text{front-up\_Bk4\_G} & \text{front-up\_Bk4\_B} \\ \text{front-up\_Bk5\_R} & \text{front-up\_Bk5\_G} & \text{front-up\_Bk5\_B} \end{pmatrix} \quad \text{[Equation 4]}$$

Similarly, the image data of the back face read by the back face reading unit 50 in step S06 (i.e., the Bk patches of five tones at the lower row on the output sheet B) are resolved into image data formed of respective elements of R, G, B after the SH correction. For example, the Bk1 patch of darkness value 1 (i.e., the darkest) among the Bk patches of the lower row read by the back face reading unit 50 is resolved into "front-low_Bk1_R" of R image data, "front-low_Bk1_G" of G image data and "front-low_Bk1_B" of B image data. Similar to the above, Bk patches of other darkness values 2 to 5 are respectively resolved into the elements of R, G, B. Thus, the following matrix data β is defined. The matrix data α, β are acquired as described above and the operation process of calculating the difference value as subtracting the matrix data α from the matrix data β is performed in step S07.

$$(\beta) = \begin{pmatrix} \text{front-low\_Bk1\_R} & \text{front-low\_Bk1\_G} & \text{front-low\_Bk1\_B} \\ \text{front-low\_Bk2\_R} & \text{front-low\_Bk2\_G} & \text{front-low\_Bk2\_B} \\ \text{front-low\_Bk3\_R} & \text{front-low\_Bk3\_G} & \text{front-low\_Bk3\_B} \\ \text{front-low\_Bk4\_R} & \text{front-low\_Bk4\_G} & \text{front-low\_Bk4\_B} \\ \text{front-low\_Bk5\_R} & \text{front-low\_Bk5\_G} & \text{front-low\_Bk5\_B} \end{pmatrix} \quad \text{[Equation 5]}$$

Subsequently, it is determined whether or not the difference value as subtracting the matrix data α from the matrix data β is equal to or larger than a predetermined value (step S08). When the difference is less than the predetermined value (No, in step S08), the tone correction data 78 is determined and the arithmetic process ends. In this manner, in step S08, both images for correction respectively based on the matrix data X, Z formed on the output sheet B in step S04 are read by the image reading unit 35 and the difference of the image data is compared and evaluated. Then, when the difference is less than the predetermined value which is previously specified, the difference of reading accuracy between the image reading unit 35 and the back face reading unit 50 is determined to be in an extremely decreased state and the tone correction data 78 is determined thereafter.

Meanwhile, when the difference value as subtracting the matrix data α from the matrix data β is equal to or larger than the predetermined value in step S08 (Yes, in step S08), the tone correction data 78 calculated in step S03 is to be recalculated.

The image data of the back face read by the back face reading unit 50 in step S06 (i.e., the Bk patches of five tones at the lower row on the output sheet B) are resolved into image data formed of respective elements of R, G, B after only the SH correction without performing the tone correction. For example, the Bk1 patch of darkness value 1 (i.e., the darkest) among the Bk patches of the lower row read by the back face reading unit 50 is resolved into "back-low_Bk1_R" of R image data, "back-low_Bk1_G" of G image data and "back-low_Bk1_B" of B image data. Similar to the above, Bk patches of other darkness values 2 to 5 are respectively resolved into the elements of R, G, B. Thus, the following matrix data (i.e., the other image data) γ is defined.

$$(\gamma) = \begin{pmatrix} \text{back-low\_Bk1\_R} & \text{back-low\_Bk1\_G} & \text{back-low\_Bk1\_B} \\ \text{back-low\_Bk2\_R} & \text{back-low\_Bk2\_G} & \text{back-low\_Bk2\_B} \\ \text{back-low\_Bk3\_R} & \text{back-low\_Bk3\_G} & \text{back-low\_Bk3\_B} \\ \text{back-low\_Bk4\_R} & \text{back-low\_Bk4\_G} & \text{back-low\_Bk4\_B} \\ \text{back-low\_Bk5\_R} & \text{back-low\_Bk5\_G} & \text{back-low\_Bk5\_B} \end{pmatrix}$$ [Equation 6]

Specifically, the difference of the image data as subtracting the matrix data α from the matrix data γ is calculated by the arithmetic processing portion 67. Then, based on the above, the tone correction data 78 (fr, fg, fb) are calculated once more so as to decrease the image data difference. The operation process to acquire the matrix data α, γ and the tone correction data 78 as described above is performed in step S09.

Next, the SH correction and the tone correction are performed on the image data of the output sheet B read by the back face reading unit 50 based on the tone correction data 78 (fr, fg, fb) which is calculated in step S09. Thus, the following matrix data Σ is defined.

$$(\Sigma) = \begin{pmatrix} fr(\text{back-low\_Bk1\_R}) & fg(\text{back-low\_Bk1\_G}) & fb(\text{back-low\_Bk1\_B}) \\ fr(\text{back-low\_Bk2\_R}) & fg(\text{back-low\_Bk2\_G}) & fb(\text{back-low\_Bk2\_B}) \\ fr(\text{back-low\_Bk3\_R}) & fg(\text{back-low\_Bk3\_G}) & fb(\text{back-low\_Bk3\_B}) \\ fr(\text{back-low\_Bk4\_R}) & fg(\text{back-low\_Bk4\_G}) & fb(\text{back-low\_Bk4\_B}) \\ fr(\text{back-low\_Bk5\_R}) & fg(\text{back-low\_Bk5\_G}) & fb(\text{back-low\_Bk5\_B}) \end{pmatrix}$$ [Equation 7]

Then, the control portion 110 forms an image for correction on one face of one sheet (i.e., the output sheet B) once more with the image data formed of the matrix data α and the matrix data Σ acquired as described above by controlling the image forming portion 103 (step S10). Specifically, the matrix data α is the image data after SH correction of the image reading unit 35 and the matrix data Σ is the image data after the SH correction and the tone correction of the back face reading unit 50. Similar to the image described in step S04, the image for correction formed on the output sheet B is formed of a plurality of patches arranged in the order of red (R), green (G), blue (B) and black (Bk) from the upper part in FIG. 4.

Subsequently, returning to step S05 after the output sheet B is formed in step S10, it is determined whether or not the output number of the output sheet B is equal to or more than a predetermined number. When the number is equal to or more than the predetermined number (Yes, in step S05), the tone correction data 78 is determined and the arithmetic process ends. Meanwhile, when the output number of the output sheet B is less than the predetermined number in step S05 (No, in step S05), the processes of steps S06 to S10 are repeatedly performed so that the appropriate tone correction data 78 is calculated and determined.

In this manner, with the copying machine 1 of the present embodiment, the tone correction data 78 to correct reading accuracy between the image reading unit 35 and the back face reading unit 50 can be calculated and determined by outputting the output sheet B within a range of predetermined number of times. Here, there is a case that the tone correction data 78 cannot be determined even though the output sheet B is outputted over the predetermined number of times. In such a case, the tone correction data 78 calculated at the time of outputting the output sheet B at the predetermined number of times is to be adopted.

In the description of the present embodiment, the colors of patches of the output sheets A, B are red, green and blue. However, it is natural that the same effects can be obtained even when yellow, magenta and cyan which are the toner colors of the copying machine 1 are utilized. Further, the output sheets A, B formed at the copying machine 1 of the present embodiment may be fed in the lateral direction or the longitudinal direction of the sheet against the sheet conveying direction of the copying machine 1. The similar effects can be obtained in both cases.

Further, in the description of the present embodiment, the image data read by the back face reading unit 50 is corrected with the tone correction data 78 so as to be matched to the image data read by the image reading unit 35. However, it is obviously possible to be configured to correct reversely.

The copying machine 1 of the present embodiment which is described above includes the arithmetic processing portion 67 to calculate the difference of the image data read by the image reading unit 35 and the back face reading unit 50. Then, based on the difference of the calculated image data, the arithmetic processing portion 67 calculates the tone correction data 78 to decrease the difference of the image data caused by the difference of the reading accuracy of the image reading unit 35 and the back face reading unit 50. Further, the copying machine 1 includes the control portion 110 which controls the image forming portion 103 so as to form the image for correction to correct the difference of the reading accuracy based on the tone correction data 78. Then, the abovementioned arithmetic processing portion 67 calculates the difference of the image data once more based on the data of the image for correction formed by the image forming portion 103 and calculates the tone correction data 78 as the correction data once more based on the difference of the image data. By constituting the copying machine 1 as described above, the difference of the reading accuracy occurring between the image reading unit 35 and the back face reading unit 50 can be reliably decreased with a simple configuration.

Further, with the copying machine 1, the tone correction of the image read by the image reading unit 35 and the back face reading unit 50 can be performed with the output sheets A, B which are formed by the image forming portion 103 without utilizing a special expensive chart for correction having controlled darkness. Further, with the copying machine 1 of the present embodiment, a member such as a chart for correction as described above is not necessarily to be previously prepared. Accordingly, there is no need to consider missing and deterioration of such a supplemental member. Namely, there may be no need to perform maintaining and managing of the supplemental member.

Further, the arithmetic processing portion 67 calculates the tone correction data 78 for correction, having one image data as the reference, so that the other image data is matched thereto among the image data respectively read by the image data reading unit 35 and the back face reading unit 50. Accordingly, the configuration can be obtained so that the apparatus does not require a process such as tone managing to perform against a chart for calculating correction data.

Further, the plurality of single color patches having difference darkness are arranged in the image for correction formed by the image forming portion 103. In addition, in the image for correction, the single color patches (for example, the patches Ba, Bc) having the same darkness among the data of images for correction which are respectively read by the image reading unit 35 and the back face reading unit 50 when the tone correction data 78 is calculated by the arithmetic processing portion 67 are arranged to be adjacent to each other. Accordingly, the above configuration enables calculation of the tone correction data 78 to decrease the difference (i.e., the darkness difference) of the images read by the image reading unit 35 and the back face reading unit 50 which respectively perform reading of front and back faces of originals without being affected by unevenness within a page and unevenness between pages of the read image for correction.

Further, the control portion 110 controls the image forming portion 103 so as to form the predetermined image for correction in the case that the tone correction data 78 has not been calculated by the arithmetic processing portion 67. Accordingly, the tone correction data 78 can be calculated without previously preparing a special chart for correction.

Further, the plurality of single color patches having difference darkness are arranged in the predetermined image for correction formed by the image forming portion 103. Accordingly, the tone correction data 78 which enables correction of intermediate darkness of the image data read by the image reading unit 35 and the back face reading unit 50.

Furthermore, the image reading unit 35 reads the first face of the original and the back face reading unit 50 reads the second face of the original. Accordingly, the tone correction data 78 to decrease the difference of the read images of the front and back faces which are the first and second faces of the original can be calculated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-328726, filed Dec. 24, 2008, which is hereby incorporated by reference herein in its entirety.

What is claimed is:

1. An image forming apparatus, comprising:
   a first reading portion which reads an image of a first face of an original;
   a second reading portion which reads an image of a second face of an original;
   an image forming portion which forms an image on a sheet based on image data read by the first and second reading portions;
   a calculation portion which calculates difference between respective image data when an image formed on a sheet is respectively read by the first and second reading portions;
   a correction portion which calculates correction data to decrease difference of the image data caused by reading accuracy difference between the first and second reading portions based on the image data difference calculated by the calculation portion; and
   a control portion which (i) controls the image forming portion so that a first image for correction which is read by the first reading portion and a second image for correction which is read by the second reading portion to correct the reading accuracy difference are formed on a same sheet based on the correction data which is calculated by the correction portion based on the image data difference calculated by the calculation portion based on a predetermined image read by the first and second reading portions,
   (ii) controls one of the first reading portion and the second reading portion so as to read the first image for correction and the second image for correction formed on the sheet by the image forming portion,
   (iii) uses the correction data when the image data difference between the first image for correction and the second image for correction which are read by one of the first reading portion and the second reading portion is less than a predetermined number, and
   (iv) controls the calculation portion so as to recalculate an image data difference between first images for correction or second images for correction which are respectively read by the first reading portion and the second reading portion and controls the correction portion so as to calculate correction data to decrease difference of the image data caused by reading accuracy difference between the first and second reading portions based on the image data difference calculated by the calculation portion when the image data difference is equal or larger than the predetermined number.

2. The image forming apparatus according to claim 1, wherein one image data is a reference among image data respectively read by the first and second reading portions, and the correction portion calculates correction data based on the image data difference calculated by the calculation portion so that the other image data is matched to the one image date.

3. The image forming apparatus according to claim 1, wherein a plurality of single color patches having different darkness are respectively arranged in the first and the second images for correction formed by the image forming portion so that color patches of same darkness among data of the first and the second images for correction are adjacently arranged.

4. The image forming apparatus according to claim 1, wherein the control portion controls the image forming portion so that the predetermined image is formed when the correction data is not calculated by the correction portion;
the calculation portion calculates image data difference based on the data of the predetermined image formed by the image forming portion; and
the correction portion calculates correction data based on the image data difference calculated by the calculation portion.

5. The image forming apparatus according to claim 4, wherein a plurality of single color patches having different darkness are arranged in the predetermined image formed by the image forming portion.

6. The image forming apparatus according to claim 1, wherein the image forming portion forms, on the same face of a sheet as the image for correction, the first image for correction related to image data read by the first image reading portion and the second image for correction related to image data read by the second image reading portion.

7. The image forming apparatus according to claim 1, wherein the predetermined image is formed on a sheet by the image forming portion.

* * * * *